(12) United States Patent
Feigl et al.

(10) Patent No.: US 10,644,545 B2
(45) Date of Patent: May 5, 2020

(54) COIL POSITIONING DEVICE

(71) Applicant: Continental Automotive GmbH, Hannover (DE)

(72) Inventors: Andreas Feigl, Bad Abbach (DE); Youri Vassilieff, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/092,603

(22) PCT Filed: Apr. 3, 2017

(86) PCT No.: PCT/EP2017/057811
§ 371 (c)(1),
(2) Date: Oct. 10, 2018

(87) PCT Pub. No.: WO2017/178259
PCT Pub. Date: Oct. 19, 2017

(65) Prior Publication Data
US 2019/0123596 A1    Apr. 25, 2019

(30) Foreign Application Priority Data

Apr. 13, 2016 (EP) .................................... 16165120

(51) Int. Cl.
*H02J 50/90* (2016.01)
*H02J 7/02* (2016.01)
(Continued)

(52) U.S. Cl.
CPC .............. *H02J 50/90* (2016.02); *B60L 53/12* (2019.02); *B60L 53/38* (2019.02); *H02J 7/025* (2013.01);
(Continued)

(58) Field of Classification Search
CPC . H02J 50/90; H02J 50/10; H02J 7/025; B60L 53/12; B60L 53/38; Y02T 90/125;
(Continued)

(56) References Cited

U.S. PATENT DOCUMENTS

| | | | |
|---|---|---|---|
| 5,821,731 A | 10/1998 | Kuki et al. | 320/108 |
| 2010/0315039 A1 | 12/2010 | Terao et al. | 320/108 |

(Continued)

FOREIGN PATENT DOCUMENTS

| | | | |
|---|---|---|---|
| JP | 2011-217452 A | 10/2011 | ............. B60L 11/18 |
| WO | 2017/178259 A1 | 10/2017 | ............. B60L 11/18 |

OTHER PUBLICATIONS

European Search Report, Application No. 16165120.3, 8 pages, dated Sep. 27, 2016.
(Continued)

*Primary Examiner* — Nha T Nguyen
(74) *Attorney, Agent, or Firm* — Slayden Grubert Beard PLLC

(57) ABSTRACT

Some embodiments include a coil positioning device for a wireless charging system comprising: a movable coil unit with a first coil; and a drive mechanism coupled to the movable coil unit to move the movable coil unit into a charging position with respect to a second coil. The drive mechanism comprises a motor and a converter mechanism for transferring an output generated by the motor to the movable coil unit to generate a multidimensional movement of the movable coil unit.

7 Claims, 4 Drawing Sheets

(51) Int. Cl.
　　　*H02J 50/10*　　　　(2016.01)
　　　*B60L 53/38*　　　　(2019.01)
　　　*B60L 53/12*　　　　(2019.01)

(52) U.S. Cl.
　　　CPC ........... *H02J 50/10* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
　　　CPC ..... Y02T 90/121; Y02T 90/14; Y02T 90/122; Y02T 90/12; Y02T 10/7005; Y02T 10/7072
　　　See application file for complete search history.

(56) References Cited

U.S. PATENT DOCUMENTS

| 2012/0262002 | A1  | 10/2012 | Widmer et al. ............... 307/104 |
| 2015/0217655 | A1  | 8/2015  | Sankaran et al. ............... 701/22 |
| 2016/0052414 | A1* | 2/2016  | Bell .................... G01M 17/007 320/108 |
| 2017/0033588 | A1* | 2/2017  | Wu ........................ H02J 7/025 |

OTHER PUBLICATIONS

International Search Report and Written Opinion, Application No. PCT/EP2017/057811, 13 pages, dated Jun. 28, 2017.

\* cited by examiner

COIL POSITIONING DEVICE

CROSS-REFERENCE TO RELATED APPLICATIONS

This application is a U.S. National Stage Application of International Application No. PCT/EP2017/057811 filed Apr. 3, 2017, which designates the United States of America, and claims priority to EP Application No. 16165120.3 filed Apr. 13, 2016, the contents of which are hereby incorporated by reference in their entirety.

TECHNICAL FIELD

The present disclosure relates to wireless charging systems. Various embodiments may include a coil positioning device for a wireless charging system.

BACKGROUND

In wireless charging systems, the efficiency of a charging process depends on whether associated coils are arranged at an optimum position with respect to each other. Small deviations from the optimum position result in a considerable decrease in efficiency. Since it is difficult in practice for users to place objects to be charged at the optimum position, wireless charging systems have been developed in which the position of the charging coil is variable. In this way, the charging coil in the charging device of the wireless charging system can be moved within a defined area in order to place the charging coil at the optimum position for the charging performance of the device to be charged. In other words, known wireless charging systems can compensate a positional offset of the coils to achieve an improvement in charging efficiency.

The movement area of the charging coil, however, is normally restricted to a defined range and the charging coil is moved in two dimensions. In order to perform such a movement of the charging coil, it is typical to use electric motors, one for each axis. Consequently, in order to enable a two-dimensional movement, two electric motors are needed. Such systems are complex and involve high costs.

SUMMARY

The teachings of the present disclosure may be embodied in an enhanced coil positioning device. For example, some embodiments include a coil positioning device with a movable coil unit at least comprising a first coil of two mating energy transfer coils of the wireless charging system. Furthermore, the coil positioning device comprises a drive mechanism operatively coupled to the movable coil unit and adapted to move the movable coil unit into an optimum position with respect to a second coil of the two mating energy transfer coils. The drive mechanism comprises a motor and a converter mechanism for transferring an output generated by the motor to the movable coil unit in such a manner that a multidimensional movement of the movable coil unit is generated.

In some embodiments, a coil positioning device for a wireless charging system comprises: a movable coil unit (1) at least comprising a first coil (10) of two mating energy transfer coils of the wireless charging system, and a drive mechanism (3, 4, 5) operatively coupled to the movable coil unit (1) and adapted to move the movable coil unit (1) into an optimum position with respect to a second coil (6) of the two mating energy transfer coils (6, 10). The drive mechanism (3, 4, 5) comprises a motor (5) and a converter mechanism (3, 4) for transferring an output generated by the motor (5) to the movable coil unit (1) in such a manner that a multidimensional movement of the movable coil unit (1) is generated.

In some embodiments, the converter mechanism (3, 4) comprises a guiding device (3) providing a multidimensional movement path for the movable coil unit (1).

In some embodiments, the guiding device comprises a guiding plate (3) with a guiding groove (2) formed along a multidimensional, e.g. a two-dimensional path, wherein the movable coil unit (1) is at least partially accommodated in the guiding groove (2).

In some embodiments, the multidimensional path is at least partially curved and/or spirally shaped.

In some embodiments, the converter mechanism (3, 4) further comprises a force transfer device (4) for transferring an output of the motor (5) to the movable coil unit (1), wherein the motor output is applied on the force transfer device (4) at a first force application point (F1) and force is transferred from the force transfer device (4) to the movable coil unit (1) at a second force application point (F2), wherein the force transfer device (4) is configured such that the distance between the first force application point (F1) and the second force application point (F2) is variable.

In some embodiments, the force transfer device (4) is fixedly coupled to an output element (7) of the motor (5) and the movable coil unit (1) is coupled to the force transfer device (4) so as to be movable relative to the output element (7) in a direction differing from a movement direction of the output element (7).

In some embodiments, the force transfer device (4) comprises an elongate element (8) having a straight groove (11) and wherein the movable coil unit (1) is movably guided in the groove (11).

In some embodiments, the motor (5) comprises a rotating output element (7).

In some embodiments, there is a communication device (9), e.g. an antenna, for a data exchange with another element of the wireless charging system, the communication device (9) being configured to be movable synchronous with the movable coil unit (1).

As another example, some embodiments include a charging device comprising a coil positioning device according to the preceding description, wherein the first coil (10) is an emitting coil.

BRIEF DESCRIPTION OF THE DDRAWINGS

Figure 7:
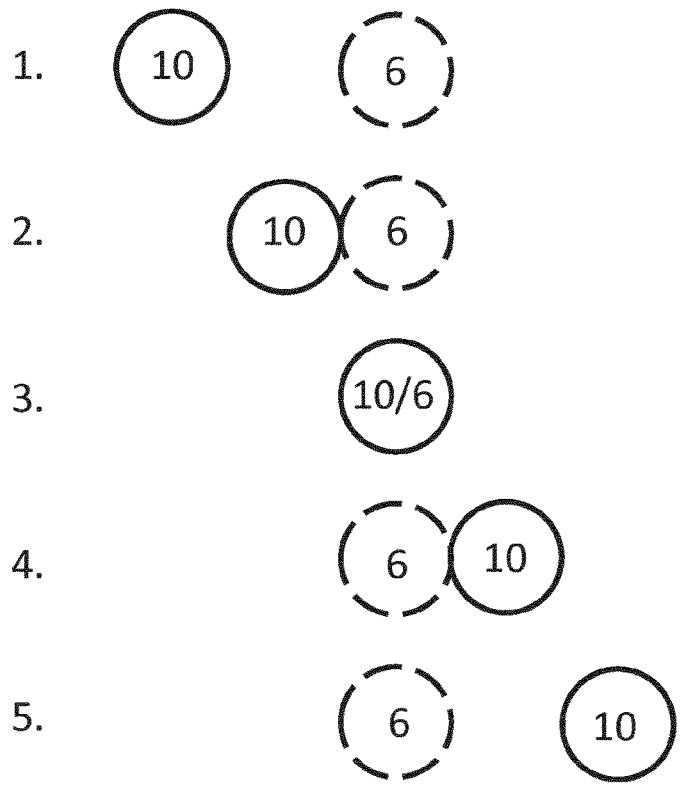

FIG. 7 schematically shows an exemplary movement of the movable coil unit with respect to a receiver coil.

Figure 8:
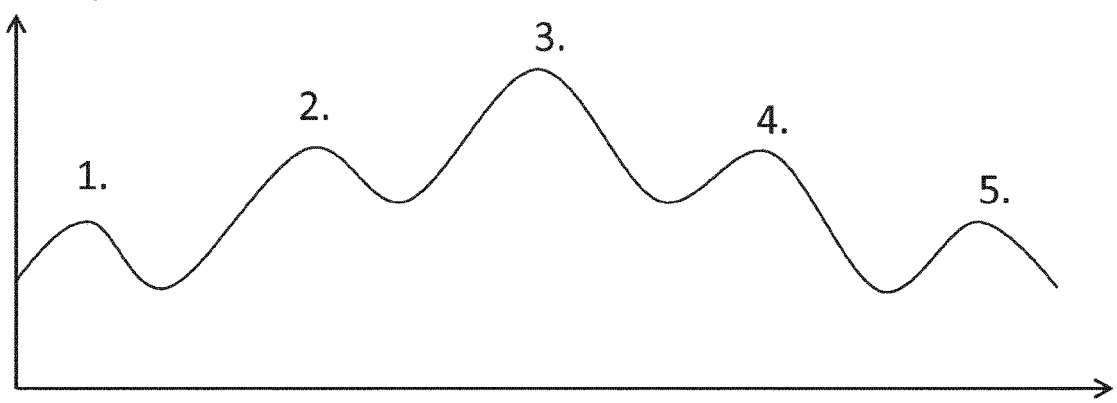

FIG. 8 illustrates a variation in loading efficiency upon movement of the movable coil unit between the states as shown in FIG. 7.

DETAILED DESCRIPTION

By moving the movable coil unit in a multidimensional manner, it is possible to reduce or eliminate a vertical and/or lateral misalignment of the two mating energy transfer coils thereby enhancing the energy transfer efficiency. In other words, the converter mechanism can generate a movement of the movable coil unit for minimizing a distance between the two mating energy transfer coils. By using the converter mechanism, the output generated by the motor is converted and can be applied on the movable coil unit such that a multidimensional movement of the movable coil unit is generated. Thus, with the converter mechanism, a one-dimensional output of the motor such as a rotational or linear output can be transferred into a multidimensional, e.g. a two-dimensional movement of the coil unit. Accordingly, it is possible to drive the movable coil unit in multiple dimensions with a single motor.

In some embodiments, the converter mechanism comprises a guiding device providing a multidimensional movement path for the movable coil unit. Accordingly, the guiding device provides an at least two-dimensional movement path. Such a guiding device may for example include guiding grooves for guiding the coil unit. However, other suitable means can be used in order to guide the coil unit. Using such a guiding device has the benefit that a reproducible movement of the coil unit can be achieved with low effort.

In some embodiments, the guiding device of the converter mechanism can comprise a guiding plate with a guiding groove formed along a multidimensional path, e.g. a two-dimensional path, wherein the movable coil unit is at least partially accommodated in the guiding groove. Such a construction allows a precise guidance of the movable coil unit. In this context, it is to be noted that the multi- or two-dimensional path relates to the configuration of the guiding groove in the guiding plate. Thus, depending on the orientation of the guiding plate in the system it is nevertheless possible that the movable coil unit is moved three-dimensional when using a two-dimensional path in the guiding plate. In case a three-dimensional movement is desired, it is also possible to use a guiding device in which the guiding groove is formed along a three-dimensional path. It is further to be noted that the term plate is to be understood in a broad sense and shall not imply that the plate is an element which is substantially flat. Rather, the plate can be of any structure in which a guiding groove as described above can be provided.

In some embodiments, the multidimensional path can be at least partially curved and/or spirally shaped. With such a configuration, a movement path can be achieved in which the coil unit is moved from a center point in a specific way, e.g. in a spiraled manner, about the center point.

In some embodiments, the converter mechanism can further comprise a force transfer device for transferring an output of the motor to the movable coil unit, wherein the motor output is applied on the force transfer device at a first force application point and force is transferred from the force transfer device to the movable coil unit at a second force application point, wherein the force transfer device is configured such that the distance between the first force application point and the second force application point is variable.

By using such a force transfer device, it is possible to transfer a force from the motor onto the movable coil unit while allowing a movement of the movable coil unit with respect to the motor. In this way, the movable coil unit can be moved on a path different from the load output direction of the motor.

In some embodiments, the force transfer device can be fixedly coupled to an output element of the motor and the movable coil unit can be coupled to the force transfer device so as to be movable relative to the output element in a direction different from a movement direction of the output element.

In some embodiments, the force transfer device comprises an elongate element having a straight groove and the movable coil unit is movably guided in the groove. In this way, a simple and reliable force transfer is possible while allowing a movement of the movable coil unit in the extension direction of the groove.

In some embodiments, the output element of the motor can be a rotating output element, e.g. a rotational shaft. In case the above force transfer device is coupled to the rotational shaft such that the groove extends in a radial direction of the rotating output element, the coil unit can move towards and away from the rotational axis of the rotating output element during force transfer from the output element to the coil unit. Instead of the elongate element and the straight groove, it is possible to use other configurations for the force transfer device which allow a movement of the movable coil unit in the above described way. For example, the force transfer device can also comprise a groove which is not straight but formed multidimensional.

In some embodiments, the elongate element can be coupled to the output element of the motor at its middle section in such a manner that the straight groove extends substantially perpendicular to the rotational axis of the output element. In other words, the straight groove can extend in opposite directions from the rotational axis of the output element. With such a configuration, it is possible to transfer a rotational output of the motor to the coil unit while allowing a movement of the coil unit with respect to the rotational axis of the output element meaning that the coil unit moves about the rotation axis of the output element within the limits predefined by the above described guiding device. Accordingly, a motor comprising a rotating output element can be used to move the coil unit along a predefined path in the guiding device.

In some embodiments, there are inverted mechanical configurations of the above described configurations. For example, a configuration is described above in which the guiding groove of the guiding device is spirally shaped and the force transfer element comprises a substantially straight groove. Instead of such a configuration, it is possible to provide a force transfer device comprising a spirally shaped groove and to provide a guiding device comprising a substantially straight groove. Different variations are possible which provide a multidimensional movement of the coil unit by means of a single electric motor.

In some embodiments, the coil positioning device can further comprise a communication device configured to be movable synchronous with the coil unit. By this, the quality of communication is not affected by the position of the charging coil. The communication device can be an antenna, for instance.

In some embodiments, a vehicle charging device comprising a coil positioning device as described before is provided wherein the first coil is an emitting coil. In some embodiments, a vehicle comprising a coil positioning device as described before is provided, wherein the first coil is a receiver coil. Furthermore, a wireless charging system is provided including a vehicle charging device and a vehicle as described before.

In the following, an example embodiment is described with reference to the drawings. It is to be noted, that the same elements are denoted with the same reference signs in all figures. The basic elements of an example coil positioning device incorporating teachings of the present disclosure are shown in FIGS. 1 to 6.

The coil positioning device as shown comprises a movable coil unit 1 which is slidably accommodated in a guiding groove 2 of a guiding device which is exemplified as a guiding plate 3 in the present embodiment. As is shown in FIGS. 1 to 4, the guiding groove 2 is spirally shaped and is configured to guide the movable coil unit 1 therein. Accordingly, the possible movement path of the movable coil unit 1 is predefined by the shape of the guiding groove 2. While a spirally shaped guiding groove 2 is shown according to the present embodiment, it is to be noted that other shapes could also be applied which allow a movement of the movable coil unit 1.

As is also shown in FIGS. 1 to 4, the coil positioning device shown further comprises a force transfer device 4 indicated with a dashed line. The force transfer device 4 applies a load on the movable coil unit 1 in order to move the movable coil unit 1 along the groove 2. In the figures, the force transfer device 4 is shown as an element comprising a specific length for illustrative purposes only. It is to be noted that the length of the force transfer device 4 can be chosen as needed and is not restricted to the length as shown.

Figure 5:
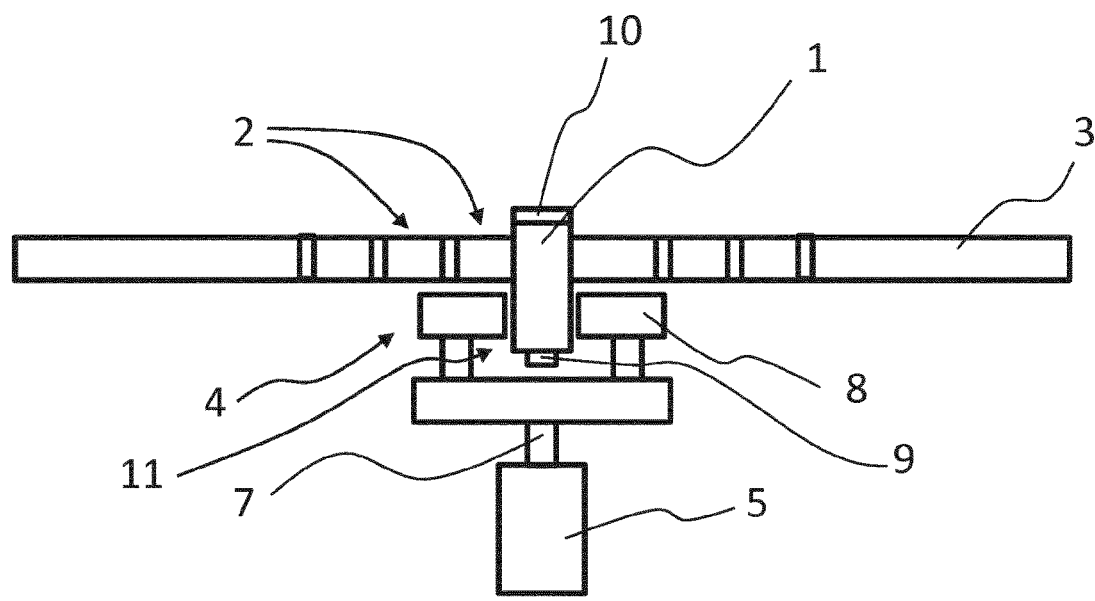
FIG. 5 shows a cross-sectional view of the coil positioning device as shown in FIGS. 1 to 4 in the state as shown in FIG. 4 and viewed in the direction of arrows A.
Figure 6:
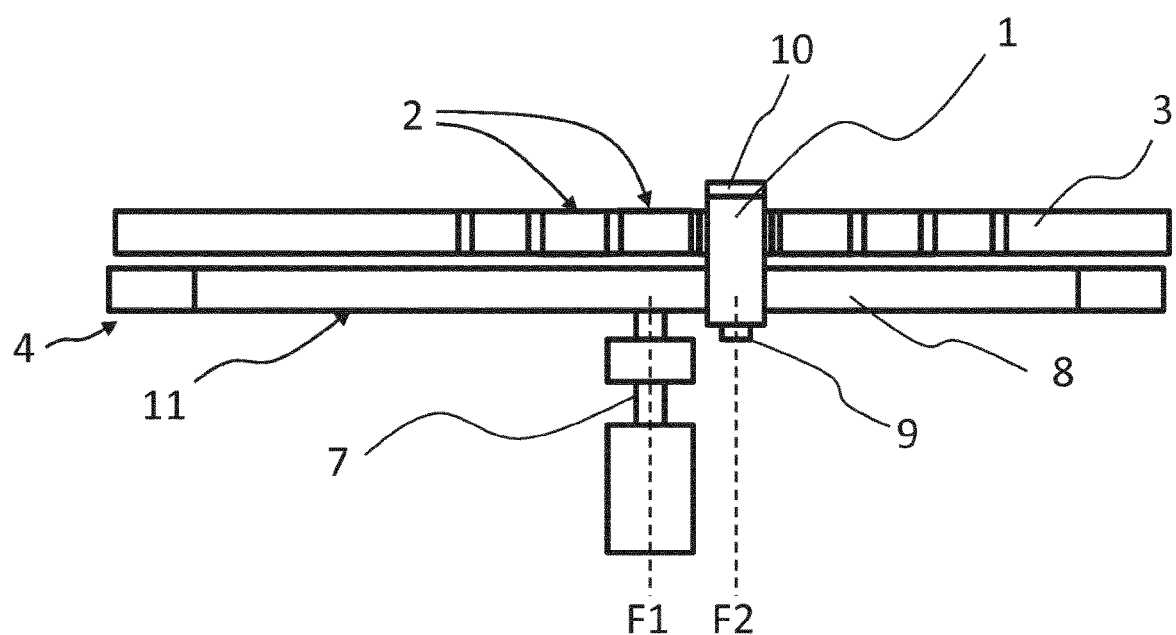
FIG. 6 shows a cross-sectional view of the coil positioning device in a state as shown in FIG. 4 and viewed in the direction of arrows B.

As is shown in FIGS. 5 and 6, the force transfer device 4 comprises an elongate element 8 with a straight groove 11 having a width which substantially corresponds to the dimension of a portion of the movable coil unit 1 which is slidably accommodated in the groove 11. More precisely, the dimension of the groove 11 is slightly larger than the dimension of the movable coil unit 1 in order to allow a sliding movement in the groove 11. Accordingly, the movable coil unit 1 is allowed to move within the groove 11 of the elongate element 8 and within the guiding groove 2 wherein the degrees of freedom predefined by both grooves cause that the movable coil unit 1 can move along the predetermined spiral path.

On its lower end, the force transfer device 4 is coupled to a rotational actuator in the form of an electric motor 5. The electric motor 5 comprises an output shaft 7 which, in the present embodiment, is oriented in the drawing plane. Furthermore, the output shaft 7 of the electric motor 5 is fixedly coupled to the force transfer device 4 and is consequently able to rotate the force transfer device 4 in the directions as indicated by double arrow C in FIG. 1. Hence, the force transfer device 4 transmits an output of the electric motor 5 to the movable coil unit 1.

With the above construction, an output force generated by the electric motor 5 is introduced into the force transfer device 4 at a first position F1 and force is transferred from the force transfer device 4 to the movable coil unit 1 at a second position F2. Due to the above described construction, the latter force application points F1 and F2 can vary since a movement of the movable coil unit 1 with respect to a rotational axis of the output shaft 7 is allowed.

The construction of the movable coil unit 1 is also shown in FIGS. 5 and 6. The movable coil unit 1 comprises an energy transfer coil 10 which in the present case is an emitter coil. More precisely, the energy transfer coil 10 is provided on an upper end of the movable coil unit 1. Furthermore, the movable coil unit 1 comprises an optional communication device 9 in the form of an antenna for a wireless communication with further objects of a wireless charging system. The communication device is provided on the lower end of the movable coil unit 1 and is fixed thereto so as to be integrally movable with the movable coil unit 1.

FIGS. 1 to 4 illustrate how the movable coil unit 1 is moved when the elongate element 8 is driven in the clockwise direction by the electric motor 5. The movable coil unit 1 will move along the groove 2 and consequently the distance from the center of the spiral increases.

Figure 1:
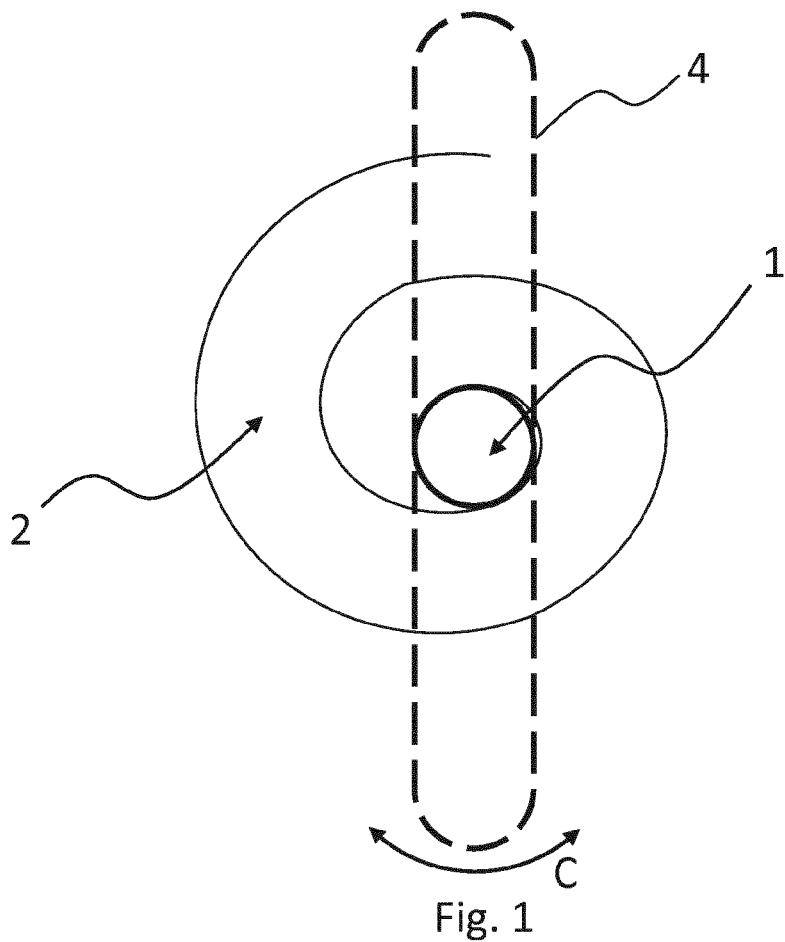
FIGS. 1 to 4 show a schematic plan view illustrating the configuration and function of a coil positioning device incorporating teachings of the present disclosure.
Figure 2:
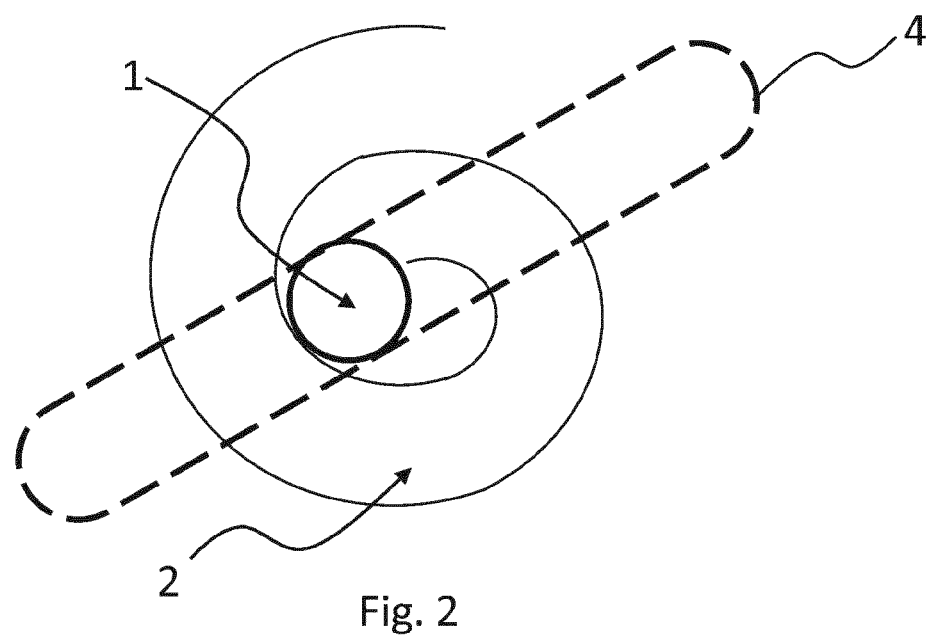
Figure 3:
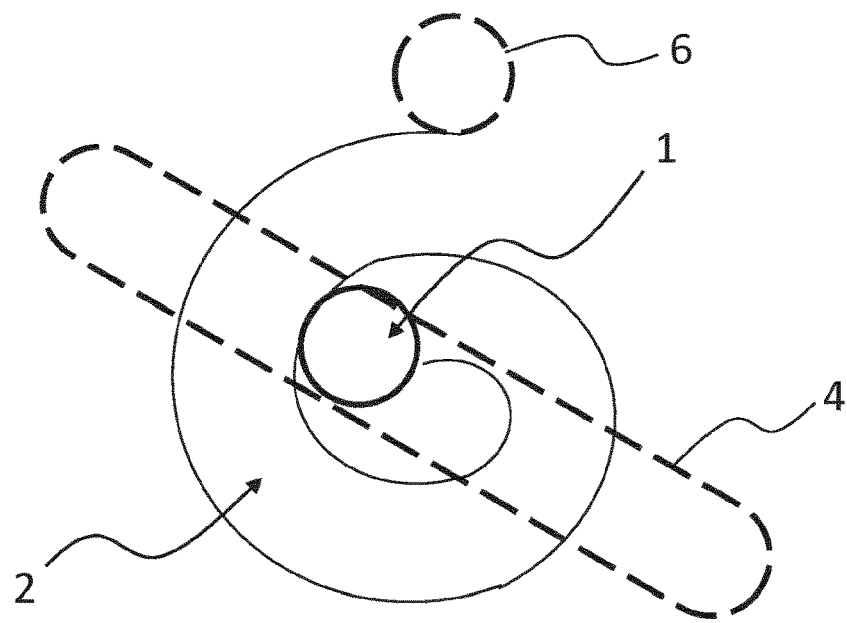
Figure 4:
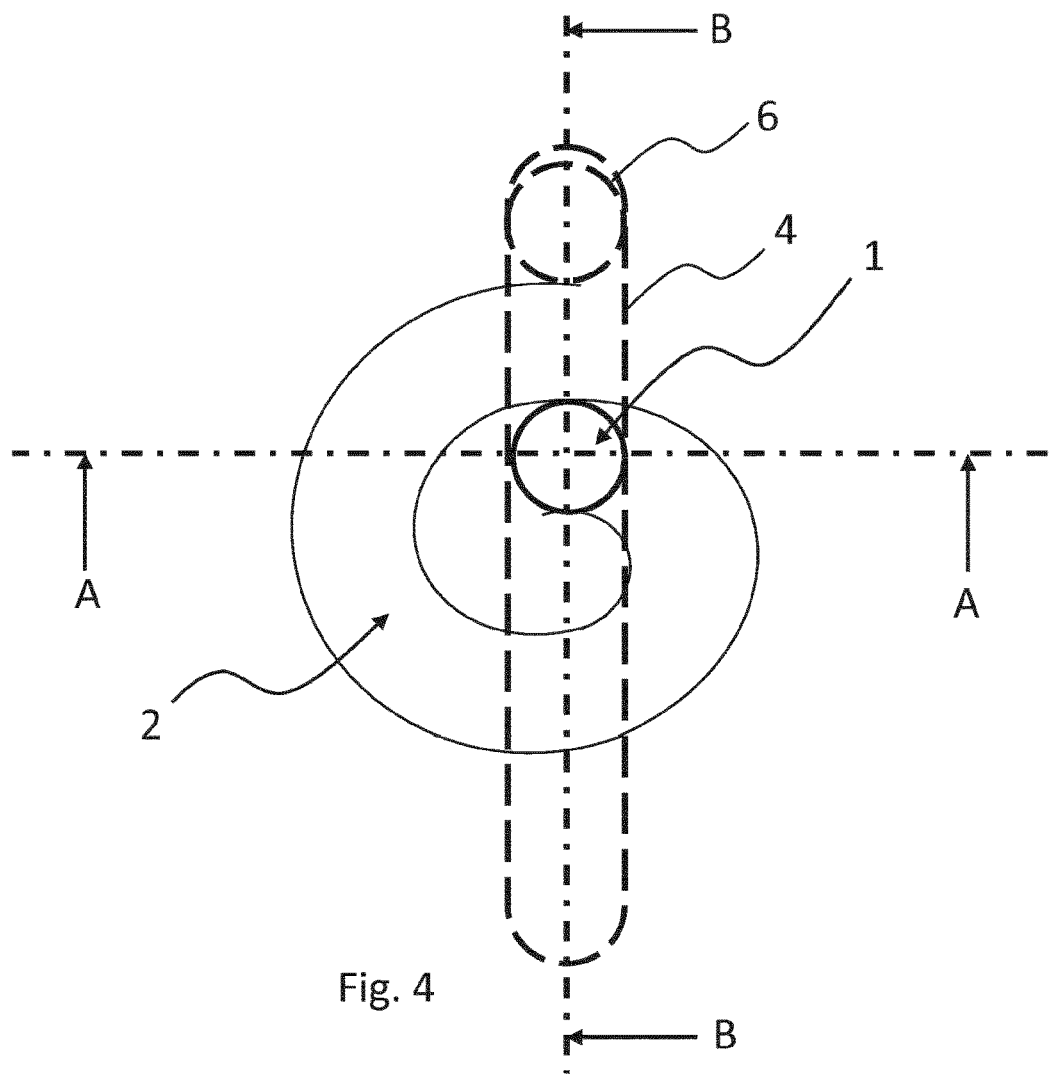

In FIGS. 3 and 4, a mating energy transfer coil 6 is shown and with the construction of the coil positioning device, the movable coil unit 1 approaches the mating energy transfer coil 6 with every revolution of the force transfer device 4. In this context, it is referred to FIG. 7 which illustrates such an approach of the energy transfer coil 10 supported on the movable coil unit 1. More precisely, FIG. 7 shows five different positions of the energy transfer coil 10 with respect to the energy transfer coil 6 wherein at the first and second position, the coil 10 approaches the coil 6 and wherein at the fourth and fifth position, the coil 10 has already passed the coil 6 and the distance between both of them increases again. The third position shows an optimum position as both coils are aligned here so that an optimum energy transfer is possible.

An energy transfer efficiency between the coils can be determined with respect to the position of the movable coil unit 1 on the movement path. FIG. 8 shows a diagram showing a change in charging efficiency when the movable coil unit is passed below the mating energy transfer coil. The positions indicated in FIG. 8 correspond to the positions indicated in FIG. 7. In this connection, it is to be mentioned that the position of the movable coil unit 1 as shown in FIG. 4 corresponds to the first position as shown in FIGS. 7 and 8.

As can be gathered from FIG. 8, the energy transfer efficiency is wavelike and reaches its maximum at the third position which corresponds to the position at which both coils are substantially aligned. The wavelike shape is a result of the spiraling movement of the movable coil unit 1. Consequently, with the above described coil positioning device, it is possible to reliably move the energy transfer coil provided in the movable coil unit 1 with only one electric motor 5. Thus, a cost efficient and reliable solution for a coil positioning device is achieved.

What is claimed is:
1. A coil positioning device for a wireless charging system, the device comprising:
   a movable coil unit with a first coil; and
   a drive mechanism coupled to the movable coil unit to move the movable coil unit into a charging position with respect to a second coil;
   wherein the drive mechanism comprises a motor and a converter mechanism for transferring an output generated by the motor to the movable coil unit to generate a multidimensional movement of the movable coil unit;
   the converter mechanism comprises a force transfer device transferring an output of the motor to the movable coil unit;
   the output of the motor is applied on the force transfer device at a first force application point;
   force is transferred from the force transfer device to the movable coil unit at a second force application point; and
   a distance between the first force application point and the second force application point is varied by operation of the converter mechanism;
   the force transfer device is fixed to an output element of the motor; and the movable coil unit is coupled to the force transfer device to move relative to the output element in a direction differing from a movement direction of the output element;

the force transfer device comprises an elongate element having a straight groove; and the movable coil unit slides in the groove.

2. The coil positioning device according to claim 1, wherein the converter mechanism comprises a guiding device having a multidimensional movement path for the movable coil unit.

3. The coil positioning device according to claim 2, wherein:

the guiding device comprises a guiding plate with a guiding groove extending along a multidimensional path; and the movable coil unit is at least partially accommodated in the guiding groove.

4. The coil positioning device according to claim 3, wherein the multidimensional path is at least partially curved.

5. The coil positioning device according to claim 1, wherein the motor comprises a rotating output element.

6. The coil positioning device according to claim 1, further comprising a communication device for data exchange, the communication device configured to move synchronous with the movable coil unit.

7. The coil positioning device according to claim 1, wherein the first coil is an emitting coil.

\* \* \* \* \*